US00RE37086E

(19) United States
(12) Reissued Patent
Moore et al.

(10) Patent Number: US RE37,086 E
(45) Date of Reissued Patent: Mar. 6, 2001

(54) FLOOR REGISTER MOUNTING FRAME

(76) Inventors: Michael A. Moore, 2607 Williams St.; Scott M. Barboza, 2621 Williams St., both of Dighton, MA (US) 02715

(21) Appl. No.: 09/480,940

(22) Filed: Jan. 11, 2000

Related U.S. Patent Documents

Reissue of:
(64) Patent No.: 5,928,078
Issued: Jul. 27, 1999
Appl. No.: 09/028,261
Filed: Feb. 23, 1998

(51) Int. Cl.[7] ..... F24F 13/06
(52) U.S. Cl. ..... 454/330; 285/341
(58) Field of Search ..... 454/330, 331, 454/332; 285/341, 335, 339

(56) References Cited

U.S. PATENT DOCUMENTS

| | | | | |
|---|---|---|---|---|
| 1,336,210 | * | 4/1920 | Druliner | 454/332 |
| 3,236,171 | * | 2/1966 | Vaskov et al. | 454/332 |
| 4,566,724 | * | 1/1986 | Arnoldt et al. | 285/364 |
| 5,472,380 | * | 12/1995 | Sarazen, Jr. et al. | 454/290 |

* cited by examiner

*Primary Examiner*—Harold Joyce
*Assistant Examiner*—Derek S. Boles

(57) ABSTRACT

A connection flange, used to fasten a floor register to a precut hole while providing an integral connection means for an air duct fitting.

4 Claims, 4 Drawing Sheets

FLOOR REGISTER MOUNTING FRAME

Matter enclosed in heavy brackets [ ] appears in the original patent but forms no part of this reissue specification; matter printed in italics indicates the additions made by reissue.

BACKGROUND

1. Field of Invention

This invention relates to the installation of registers and grilles used as air outlets or inlets in warm air heating, ventilating, and air conditioning systems, specifically to floor mounted registers.

2. Description of Prior Art

Heretofore, installers of heating, and air conditioning systems would install floor mounted registers in the following manner. A generally rectangular hole, somewhat larger than the register to be installed, would be cut through a wooden floor surface. Placed into this hole, from below, would be a duct fitting commonly refered to as a boot, generally pre-fabricated from a sheet material, having a first end of sufficient size and shape to allow insertion of the grille or register, and a second generally round end to allow connection to the air distribution system. After fastening the boot to the floor surface with screws or nails the register is inserted into the boot from above, being held in place by a combination of friction and gravity.

When using this method, the hole through the floor surface must be cut perfectly square and accurate. If the hole is cut too large, it will cause spaces, or gaps between the boot and flooring allowing air leakage between conditioned and unconditioned spaces, and allow undesirable lateral movement, and/or twisting of the register. Fasteners could be driven through the face of the register into the flooring, however they would be visible and unattractive, and could pose a hazard to a barefoot person.

If the hole is cut too small, or not perfectly square, the register will either not fit, or will have to be forced into the hole, causing binding of volume damper blades or other moving parts on the register.

When fastening the boot to the floor surface, one must exercise caution not to split the flooring material since this sometimes happens when nailing or screwing into the end grain of plywood or solid flooring. These fasteners must be driven in perfectly flush with the inner surface of the boot so they will not interfere with the insertion of the register.

This installation procedure generally requires two people, since one person must hold the boot into the hole from below the floor, to prevent it from falling out of the hole, while the second person fastens the boot to the flooring from above.

A duct connection flange described in U.S. Pat No. 4,566,724 to Arnoldt et al utilizes a protuberance arrangement that eliminates the need for external fasteners when connecting it to a duct, but requires full engagement of the duct before any fastening takes place. If the installer needs to reposition after partially engaging a corner or side of the duct, it may fall free of the flange if pressure is released. This is especially true when making a vertical connection, due to gravity. Also, because of its physical configuration this device would not fit into the hole from above the flooring. Therefore to use this device for the above application it would have to be fastened from below the floor making it cumbersome to install, and difficult to seal. Also, any device that creates a flange on the perimeter of the holes, underside could interfere with floor joists or framing members adjacent to the hole.

U.S. Pat. No. 5,472,380 to Sarazen, Jr. et al improves the original method by using a two piece snap together register which holds the register fast in the hole to prevent lateral, or twisting of the register after installation, without leaving any fasteners exposed from above. This invention however, does not make provisions for connection of the boot, but relies on creating an outwardly turned flange to be fastened to the underside of the floor surface. This requires overhead nailing which can be difficult in a confined space between floor joists as is commonly encountered in this situation. Also to achieve an airtight seal, would be difficult, since the underside of most flooring systems tends to be rough and have imperfections such as gaps in floorboards, and nails protruding from above.

OBJECTS AND ADVANTAGES

Accordingly, several objects and advantages of the present invention are:

(a) to achieve an air tight seal between conditioned and unconditioned spaces when installing an air register into a floor.

(b) to provide a system that allows for some inaccuracy in the hole cut through the floor, without sacrificing quality of the installation.

(c) to provide a means to fasten the register to the floor, without fasteners being visible or exposed after installation.

(d) to provide a means for duct connection without using external fasteners.

(e) to provide a means by which one person alone may easily complete the installation.

(f) to provide temporary fastening of boot when installed partially into duct connection, before full engagement, to allow repositioning of installer or installers hands, without boot falling from position.

(g) to provide a means to secure the boot to the top (most uniform) surface of the flooring.

Further objects and advantages will become apparent from a consideration of the ensuing description and drawings.

DRAWING FIGURES

REFERENCE NUMERALS IN DRAWINGS

| | |
|---|---|
| 10 vertical flange collar | 11 connection flange |
| 12 horizontal flange face | 14 retaining leg |
| 16 retaining teeth | 18 receiving channel |
| 20 screw hole | 22 fastener |
| 24 floor register | 26 boot |
| 28 gasket | 30 wooden flooring |
| 32 snap lock | 34 locking tab |
| 36 angular frame | 40 air directing vane |
| 42 engagement tab | 44 dust cover |

DESCRIPTION—FIGS. 1 TO 3

Figure 1A:
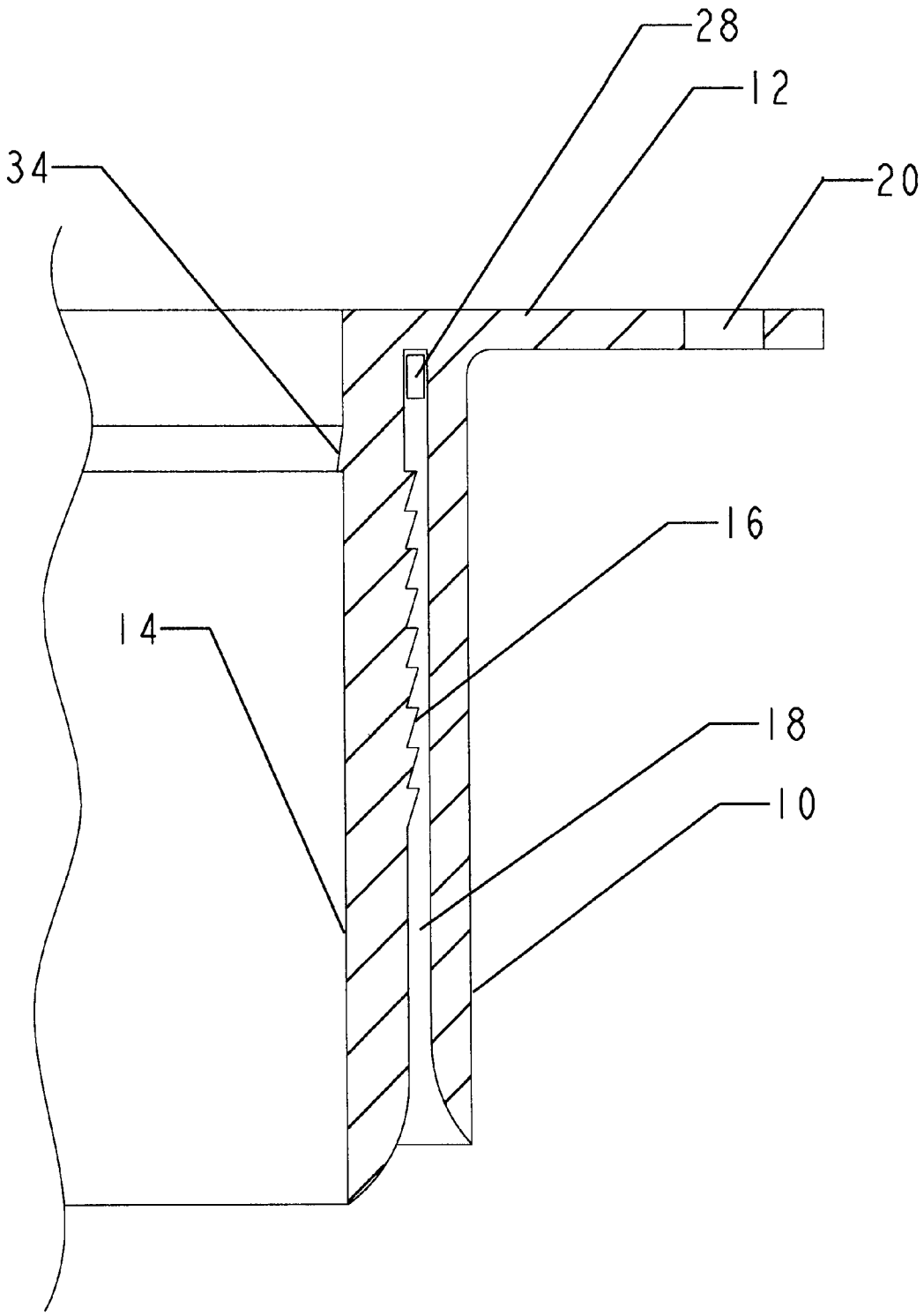
FIG. 1A shows an enlarged cross section view of a connection flange.
Figure 1B:
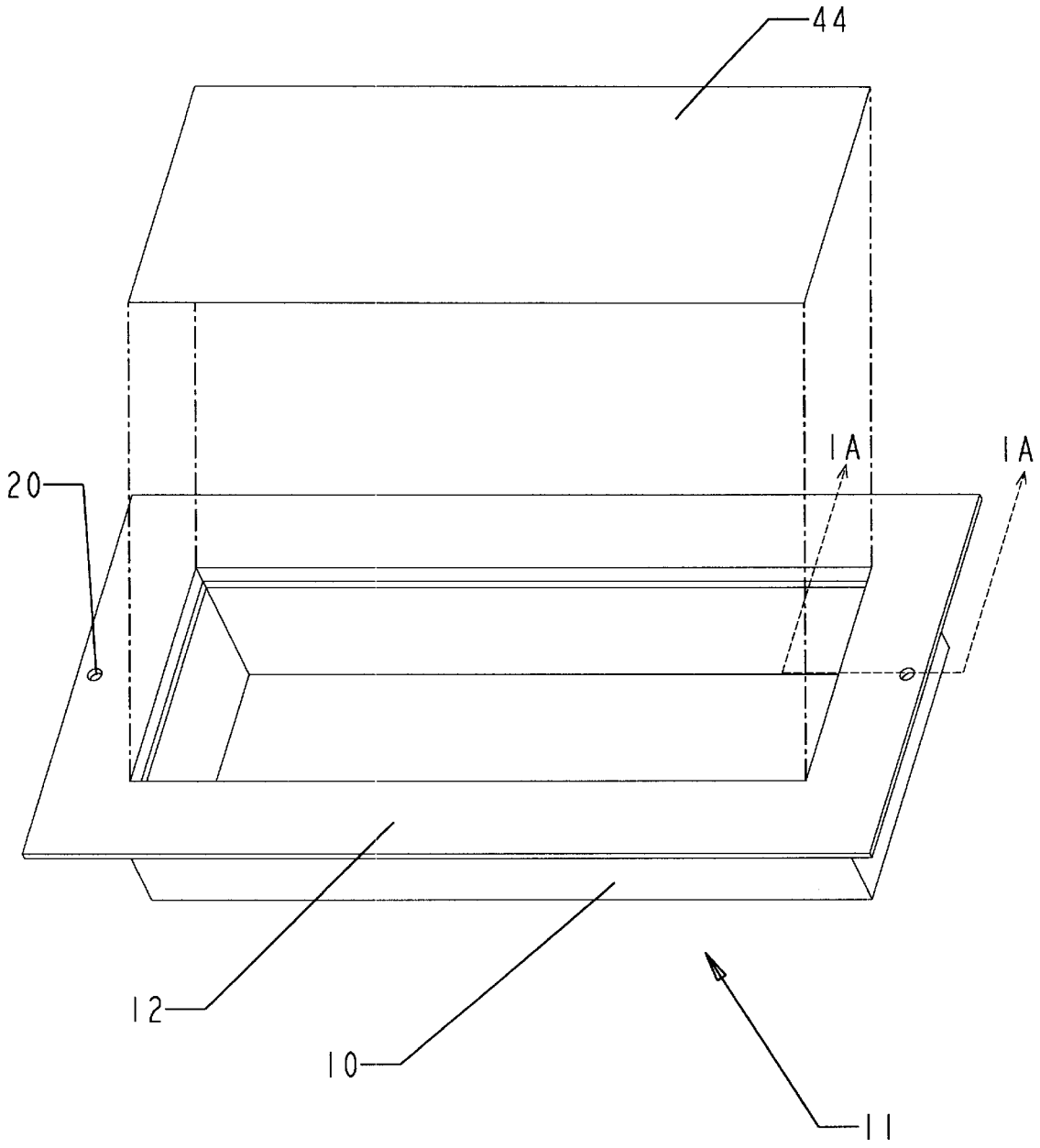
FIG. 1B shows an full view of a connection flange with a removable dust cover.

FIGS. 1A and 1B illustrate a duct connection flange 11 comprising a horizontal flange face 12 having a rectangular inner and outer perimeter. Attached to and extending at a generally right angle from the inner perimeter of face 12 is a tubular vertical flange collar 10. Collar 10 has four sides joined at right angles, and is defined as having a first end adjacent to face 12 and a second, or open end. Two pairs of parallel and oppositely faced retaining legs 14 extend from the first end of the inner side of collar 10 to create receiving channels 18 along four sides on the open end of collar 10. Attached to the channel facing side of legs 14 and running parallel to the intersection of face 12 and leg 14 are a plurality of retaining teeth 16. These teeth 16 are equal in length to legs 14, have a triangular cross section, and are angled toward the first end of collar 10. Located within channels 18 is a compressible gasket 28. Gasket 28 is continuous, encircling the inner perimeter of face 12. A plurality of locking tabs 34 extend from a point along the untoothed face of leg 14. Tabs 34 have a generally triangular cross section, extend from leg 34 at an angle of less than 90 degrees and face toward the open end of collar 10.

Figure 2:
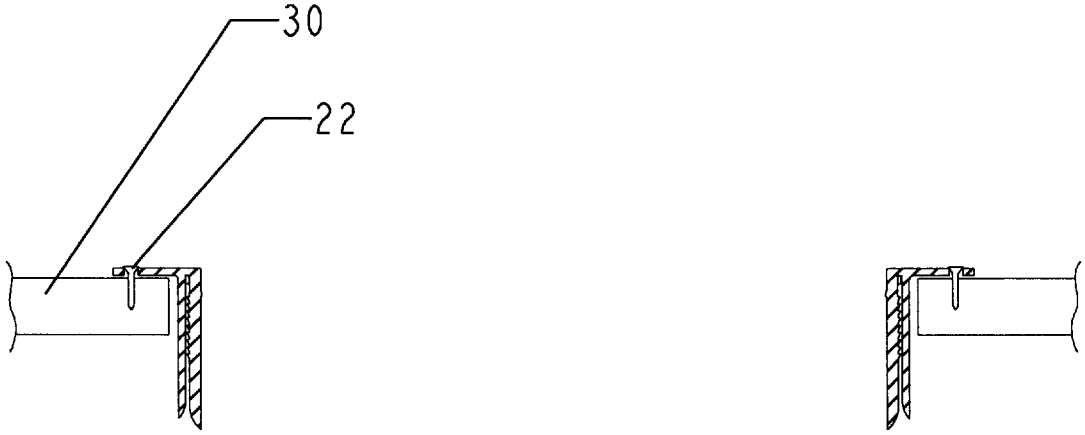
FIG. 2 shows a connection flange installed into a hole in a wooden floor.

FIG. 2 depicts flange 12 set into a hole cut through wooden flooring 30. A plurality of screw or nail type fasteners 22 pass through screw holes 20 in face 12.

Figure 3:
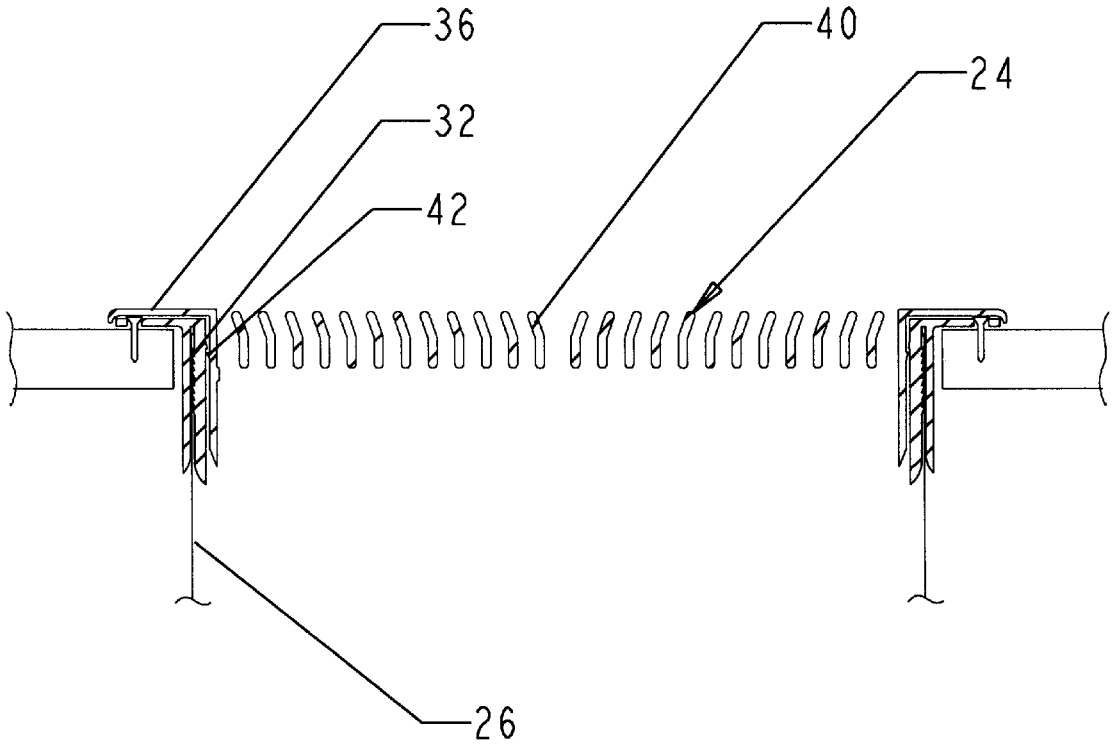
FIG. 3 shows a complete installation including duct and floor register.

FIG. 3 displays the above described device as a complete installation with the addition of floor register 24 comprising an angular frame 36, to which are attached multiple air directing vanes 40 arranged to channel passing air in a desired direction and pattern. A plurality of engagement tabs 42 extend outward from register 24 and are located in a position that allows alignment and engagement with locking tabs 34. Floor boot 26 is pre-fabricated from sheet material, having a first end of sufficient size and shape to allow insertion into receiving channel 18 and a second generally round end sized to allow connection to the air distribution system. A plurality of snap locks 32 are created along the first end of boot 26 forming a protrusion or dimple with a lanced edge, on the sheet material.

The invention described above may be manufactured from a suitable moldable material, preferably plastic (such as ABS, polyvinyl chloride, or polyethylene).

OPERATION—FIGS. 1 to 3

The method of installing the present invention and the function of its parts is described below. A hole of sufficient size and shape is cut through wooden flooring material 30. A connection flange 11 is inserted into this hole from above until flange face 12 makes contact with flooring material 30. Flange 11 is then positioned within the hole to orient it parallel and square with room walls and partitions. At this time fasteners 22 (screws or nails) may be installed through screw holes 20 into flooring 30. This stage of installation is shown in FIG. 2.

The first end of boot 26 is inserted from below into channel 18. Legs 14 alternately deflect and spring to their original position due to interference between teeth 16 and snap locks 32 causing a ratcheting action. The angle of teeth 16 and the lanced edge of snap locks 32 allow movement of boot 26 in this direction only. Because of this, at any point along this ratcheting action, boot 26 may be released by the installer's hands, and will remain supported by the flange 11. This allows the installer to partially install one easily accessible side, or corner, of boot 26, reposition hands or body for better visual perspective, or access to the remaining sides, or corners, then continue installing boot 26.

As the first end of boot 26 is pushed further into channel 18 it will first contact, then compress gasket 28. This will effectively create an air tight seal between boot 26 and flange 11.

Floor register 24 is thereafter inserted into flange 11 from above until engagement tabs 42 contact corresponding locking tabs 34. As register 24 is pushed further into flange 11 tabs 42 are deflected away from tabs 34 and spring back to their original position when register 24 is in its installed position. This action fastens register 24 in place preventing future unwanted movement or accidental removal.

SUMMARY, RAMIFICATIONS, AND SCOPE

Accordingly, the reader will see that the Floor register mounting frame provides a simple, efficient, air-tight method to install a floor mounted air outlet using only one person. It allows for some inaccuracy in the hole cut through the flooring, without sacrificing the integrity or air-tightness of the finished job. It also allows flexibility in respect to method of boot installation, through temporary fastening.

Although the description above contains many specificities, these should not be construed as limiting the scope of the invention but as merely providing an illustration of the preferred embodiment. For example, channels 18 may be placed on only two sides of flange 11. Also flange 11 may or may not include a removable dust cover 44 to prevent foreign matter from entering duct system during construction. Gasket 28 may be continuous and seamless, or consist of separate pieces, and may be held in place by friction, or by using an adhesive. Retaining legs 14 may be joined on their ends to provide rigidity, or may not be joined to allow flexibility of legs 14.

Thus the scope of the invention should be determined by the appended claims and their legal equivalents, rather than by the examples given.

We claim:

1. A connection flange, used to fasten a floor register to a precut hole while providing a connection for an air duct fitting, comprising:

a face with a generally [rectangular] *tubular* inner and outer perimeter, a tubular member with a first end extending from the inner perimeter of said face and a second end, said tubular member containing a continuous channel open to said second end to allow insertion of the end portion of said fitting said channel having a plurality of teeth extending into said channel to provide a retaining means for said fitting, said fitting comprising:

one or more protuberances located along the surface of said fitting adjacent to said end portion of said fitting, said protuberances positioned to allow movement of said fitting only in a direction which moves said fitting closer to said face.

2. The flange in claim 1 further including a sealing means located within said channel to prevent air leakage.

3. The flange in claim 1 further including one or more protuberances extending from the inner perimeter of said tubular member to provide fastening means for said register.

4. The flange in claim 1 further including a removable dust cover.

* * * * *